No. 636,853. Patented Nov. 14, 1899.
W. H. RYER.
BRACKET FOR BRAKE SHOES.
(Application filed Apr. 3, 1899.)
(No Model.) 2 Sheets—Sheet 1.
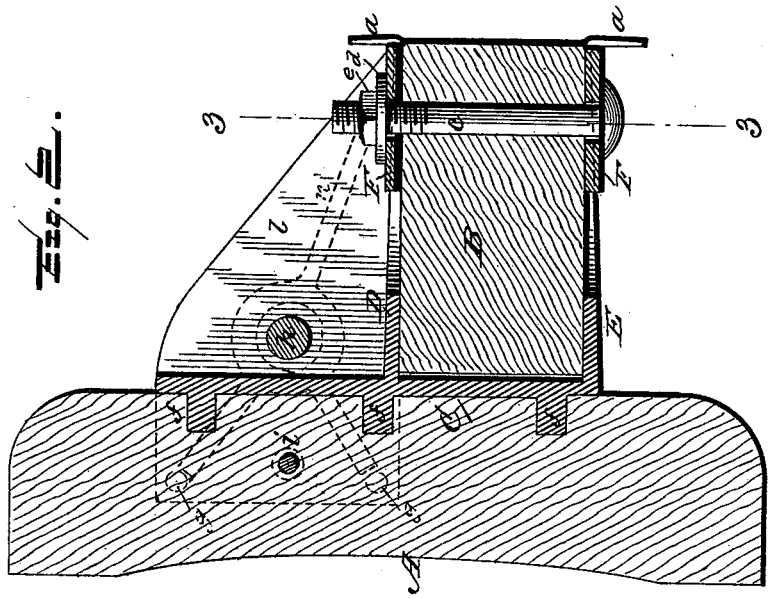
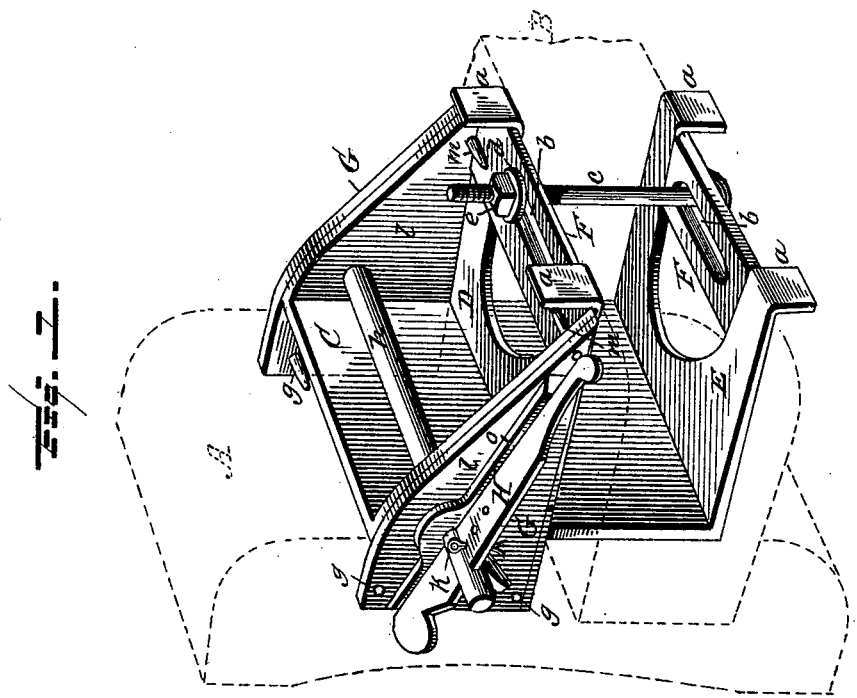
Witnesses
L. C. Hills
F. E. Barry
Inventor
William H. Ryer,
By Chas. H. Fowler
Attorney No. 636,853. Patented Nov. 14, 1899.
W. H. RYER.
BRACKET FOR BRAKE SHOES.
(Application filed Apr. 3, 1899.)
(No Model.) 2 Sheets—Sheet 2.
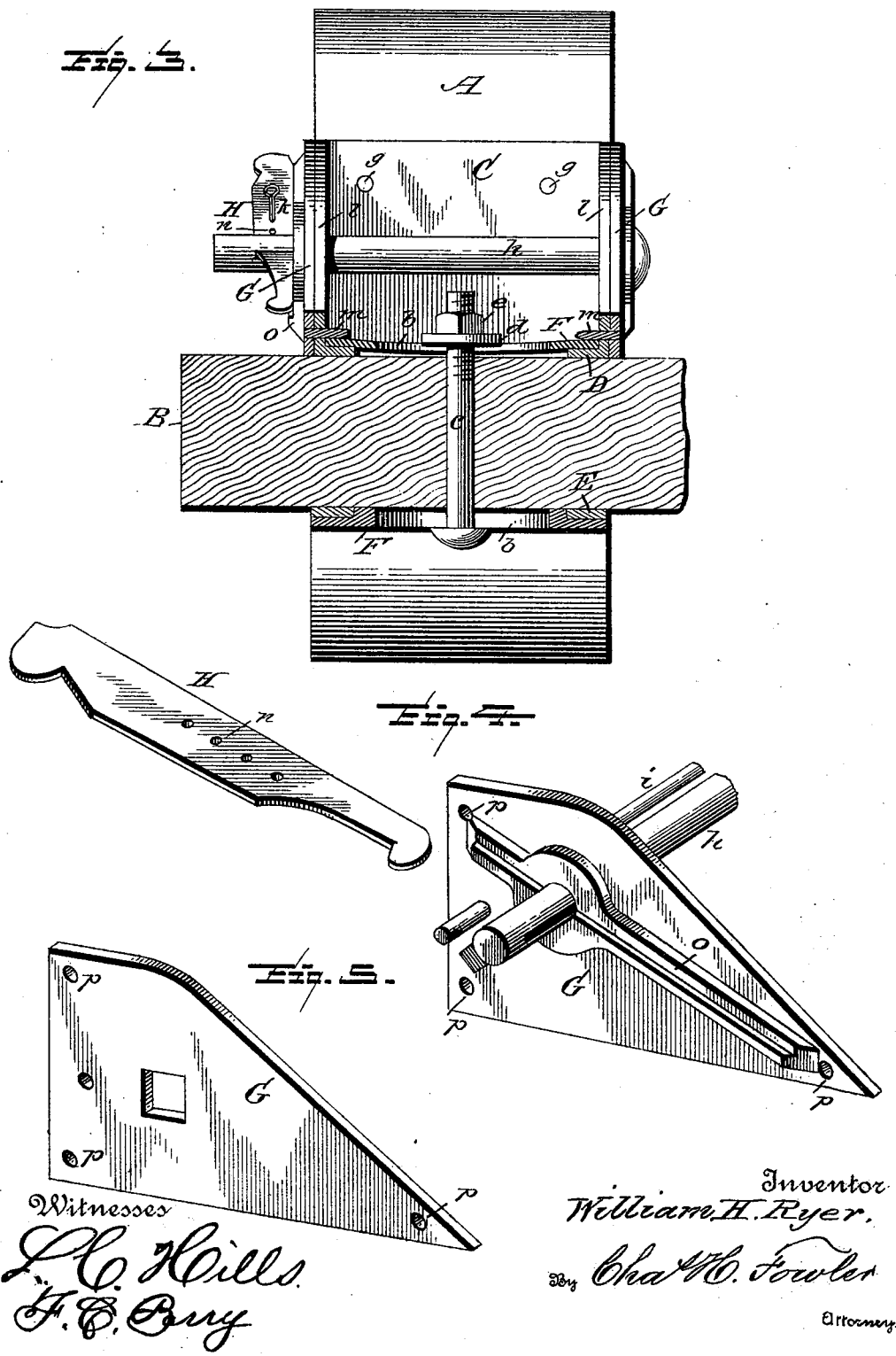

UNITED STATES PATENT OFFICE.

WILLIAM H. RYER, OF DENVER, COLORADO.

BRACKET FOR BRAKE-SHOES.

SPECIFICATION forming part of Letters Patent No. 636,853, dated November 14, 1899.

Application filed April 3, 1899. Serial No. 711,565. (No model.)

*To all whom it may concern:*

Be it known that I, WILLIAM H. RYER, a citizen of the United States, residing at Denver, in the county of Arapahoe and State of Colorado, have invented certain new and useful Improvements in Brackets for Brake-Shoes; and I do hereby declare that the following is a full, clear, and exact description of the same, reference being had to the annexed drawings, making a part of this specification, and to the letters of reference marked thereon.

The present invention has relation to the means employed for connecting the brake shoe or block to the brake beam or bar in use on railroad-cars or any wheeled vehicle in which a brake shoe or block is employed with levers or other suitable mechanism for operating it to bring the shoe or block in frictional contact with the rim of the wheel to check the speed or stop the movement of the car or other vehicle, as circumstances require.

It is the purpose of the invention to provide a simple and effective, as well as durable, bracket for attaching the brake shoe or block to the brake beam or bar; and it consists in the details of construction substantially as shown in the drawings and hereinafter described and claimed.

Figure 1 of the drawings is a perspective view of my improved bracket with its attachments, showing the brake shoe or block and the brake beam or bar in dotted lines; Fig. 2, a sectional elevation through the brake-shoe, brake-beam, and the bracket; Fig. 3, a transverse sectional elevation taken on line 3 3 of Fig. 2; Fig. 4, a detail view in perspective of one of the side clips, showing the outer side thereof and the bolts engaged therewith and the locking-key in position to enter the slot in the bolt; Fig. 5, a perspective view of the opposite one of the clips, showing the inner side thereof.

In the accompanying drawings, A represents the brake-shoe, and B the brake-beam, both of which may be of any suitable and well-known construction, either of metal or wood, or of both, as preferred.

The bracket proper comprises the upright plate C and the two bifurcated horizontal clamping-jaws D E, between which the brake-beam is held. The jaws D E extend parallel to each other, and their bifurcated ends extend outward and at right angles to the jaws to form stops and bearings $a$ for the outer edges of rectangular clamps F, and thereby hold them in position. The jaws D E are of uniform size and of a length to properly embrace the upper and lower sides of the brake-beam in contradistinction to the usual ribs or like devices heretofore employed. The clamps F are located above and below the jaws D E and have elongated openings $b$, which extend lengthwise thereof and through which passes the threaded bolt $c$, one or more being used and found desirable. The bolt $c$ extends up through the elongated openings in the clamps and through the brake-beam and has a washer $d$ and nut $e$ upon its screw-threaded end, said bolt holding the clamps and the bifurcated plates to the brake-beam. The clamps F bear against the stops or bearings $a$, the upper one of said clamps being constructed of spring metal and of the required thinness to bear up with frictional contact against the under side of the washer $d$, and thereby prevent the nut $e$ from working loose upon the screw-threaded end of the bolt.

If desired, the washer $d$ may be dispensed with and the spring-clamp bear directly against the nut, as found most preferable, the spring-clamp acting in either instance as a nut-lock.

The bifurcation of the jaws D E and the elongated openings in the clamps F enable the bracket to be adjusted from one side to the other, as the change in the dish of the wheel may require.

It is considered of material importance in constructing the upper one of the clamps of spring metal, as the upward pressure of the clamp against the washer or nut will always be maintained, and in event of the brake-beam shrinking the nut will still be held firm and not become loose and work off, as with the brake-shoe clamps usually employed. In other words, the spring action of the upper one of the clamps will always bear with frictional contact against the washer or nut, as the case may be, which will effectually prevent the nut from turning upon the bolt and working loose by the jarring action of the brake.

The upright plate C of the bracket may be cast or otherwise provided with suitable spurs or pins $f$, which may be of wedge shape or other form, as desired, or the plate may be provided with holes, by which screws, small round spikes, or nails may be used, which in some instances may be considered preferable. These spurs or other fastenings used enter the brake-shoe A to assist in holding the brake-shoe in place.

Suitable clips G bear against the outer sides of the walls $l$ and are cast with holes $p$ to receive headless nails or small round spikes, as indicated at $g\ m$.

The nails or spikes $g$ entering the sides of the brake-shoe assist in securely holding the bracket thereto.

Previous to my invention it was common to provide such clips or plates with inwardly-projecting studs by casting the plate with such studs or welding them thereon after the plate was cast, thus forming the clip or plate and studs integral. It is the purpose of the invention to dispense entirely with this mode of construction, whereby a much greater advantage is obtained in removing or attaching the clips and rendering them more simple and reducing the cost of manufacture.

In the use of headless nails or spikes extending through holes in the clips in place of the usual studs cast or otherwise formed on the clips or plates a more perfect fastening is obtained, as the nails or spikes may be of any desired length to adapt the bracket to shoes of various sizes, a bolt $i$ being also used, which extends through the rear ends of the clips G and through the brake-shoe, thereby holding the clips perfectly firm where great strain and safety are required, as on freight-cars and on log and heavy ore wagons in the mountains, this bolt, in connection with the headless nails or spikes, forming together a secure fastening for the brake-shoe.

In using the headless nails or spikes in place of the spurs usually employed the brake-shoe may be readily removed from the bracket by first loosening the bolt $i$ and disconnecting it and the clips G detached, leaving the headless nails or spikes in the old shoe and using new nails or spikes for connecting a new shoe to the bracket.

One of the clips G has a flanged support $o$ upon its outer side for a key H to rest thereon, said key extending through a slot in the end of a bolt $h$ and held in place by a spring-pin $k$ entering one of a series of holes $n$ in said key. The bolt $h$ extends through the clips G and the side walls $l$ of the bracket, and the bolt draws the clips tightly against the side wall by means of the tapering or wedge-shaped key H. The clips, if desired, may be cast with suitable strengthening-ribs upon their outer side, as shown in dotted lines of Fig. 2 of the drawings, or may be perfectly plain, as found most desirable.

I do not wish to be understood as confining myself to the specific details of construction as shown and described, as many changes or modifications may be made without in any manner departing from the principle of the invention.

Having now fully described my invention, what I claim as new, and desire to secure by Letters Patent, is—

1. A bracket for brake-shoes, comprising an upright plate with means for engaging with the brake-shoe and horizontally-extending bifurcated jaws for connecting the brake-beam thereto, the bifurcated jaws having their ends formed with outwardly-extending stops and bearings, and slotted clamps and screw-bolt for holding the jaws to the beam, substantially as and for the purpose set forth.

2. A bracket for brake-shoes, comprising an upright plate with means for engaging it with the shoe and horizontally-extending jaws for engaging the brake-beam, slotted clamps to receive a screw-bolt, one of said clamps being formed of spring metal to form a nut-lock, substantially as and for the purpose specified.

3. A bracket for brake-shoes comprising an upright plate and horizontally-extending jaws, side clips with suitable means for engaging with the brake-shoe, and suitable slotted clamps with means for securing the clamps above and below the jaws for connecting the brake-beam thereto, substantially as and for the purpose described.

4. A bracket for brake-shoes comprising an upright plate and horizontally-extending jaws, and the clips, and means for engaging the plate and clips with the brake-shoe, clamps above and below the jaws and means for connecting the clamps and jaws to the brake-beam, a fastening-bolt extending through the clips and through the side walls of the bracket, and a tapering key engaging the end of the bolt, substantially as and for the purpose set forth.

In testimony that I claim the above I have hereunto subscribed my name in the presence of two witnesses.

WILLIAM H. RYER.

Witnesses:
ETTA M. SHAFER,
R. D. REES.